United States Patent [19]

Swerlick

[11] 4,329,399
[45] May 11, 1982

[54] COATED, HEAT-SEALABLE AROMATIC POLYMER FILM

[75] Inventor: Isadore Swerlick, Wilmington, Del.

[73] Assignee: E. I. Du Pont de Nemours and Company, Wilmington, Del.

[21] Appl. No.: 193,374

[22] Filed: Oct. 6, 1980

[51] Int. Cl.³ .................. B32B 27/00; B32B 27/10
[52] U.S. Cl. ................. 428/422; 428/473.5; 428/331; 428/476.3
[58] Field of Search ............ 428/421, 422, 473.5, 428/476.3, 331

[56] References Cited

U.S. PATENT DOCUMENTS

| | | | |
|---|---|---|---|
| 2,968,649 | 1/1961 | Pailthorpe et al. | 260/80.5 |
| 3,168,417 | 2/1965 | Smith et al. | 117/213 |
| 3,179,634 | 4/1965 | Edwards | 260/78 |
| 3,179,635 | 4/1965 | Frost et al. | 260/78 |
| 3,287,324 | 11/1966 | Sweeny | 260/78 |
| 3,352,714 | 11/1967 | Anderson et al. | 117/213 |
| 3,592,714 | 7/1971 | Katz | 428/473.5 X |
| 3,661,859 | 5/1972 | Patton | 260/77.5 CH |
| 3,801,552 | 4/1974 | Kometani et al. | 260/80.77 |
| 3,962,169 | 6/1976 | Arruda et al. | 260/29.6 F |
| 4,123,603 | 10/1978 | Stewart | 526/254 |
| 4,141,874 | 2/1979 | Oka et al. | 260/29.6 F |
| 4,226,913 | 10/1980 | Henderson | 428/473.5 X |

FOREIGN PATENT DOCUMENTS 844965 2/1977 Belgium.
48-18957 6/1973 Japan.

OTHER PUBLICATIONS

Viton ® Bulletin No. 16, "Solution Coating of Viton ®, J. R. Bowman, Mar. 1966, p. 3.
Viton ® Bulletin No. 23, "Viton ® C-10 Fluoroelastomer", A. L. Moran, Jan., 1968, pp. 4, 5, 9, 10.

Primary Examiner—P. Ives

[57] ABSTRACT

Coated film having a base layer of an aromatic polymer such as polyimide, polyamide, polyamide-imide, or polyparabanic acid, and having on at least one side thereof a thermally stable, heat-sealable coating comprising a TFE:HFP:VF$_2$ terpolymer of selected composition. The coated film is useful as wire insulation.

14 Claims, 1 Drawing Figure

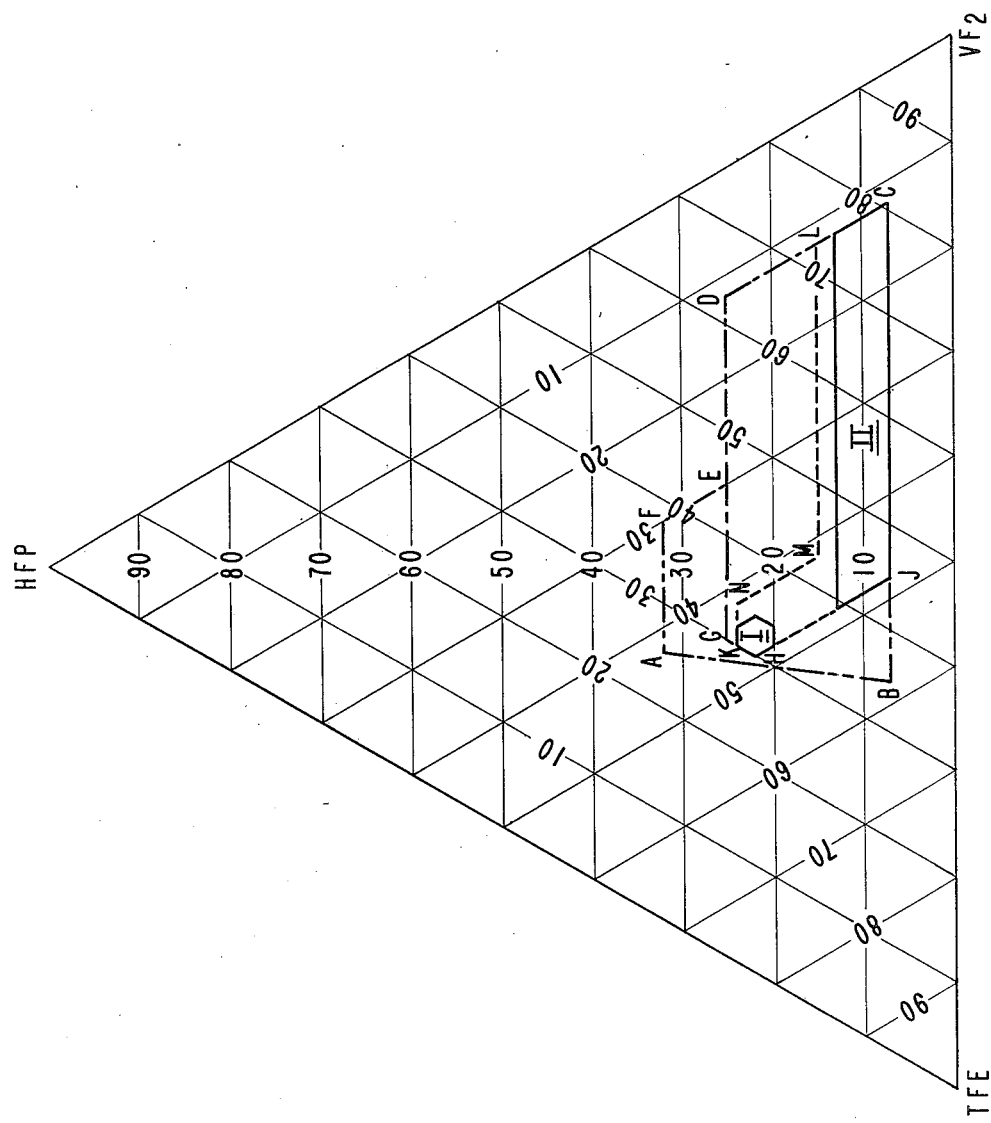

COATED, HEAT-SEALABLE AROMATIC POLYMER FILM

BACKGROUND OF THE INVENTION

This invention concerns improvements in and relating to films of aromatic polymer having a second order transition temperature of at least 200° C., especially films of aromatic polyimides, polyamides, polyamide-imides and polyparabanic acids, and in particular concerns such films which are coated with a thermally stable, heat-sealable fluorinated polymer of composition defined hereinbelow.

Films of aromatic polyimides, polyamides polyamide-imides, and polyparabanic acids (also known as poly(1,3-imidazolidine-2,4,5-triones), are known in the art, such as U.S. Pat. No. 3,179,634, U.S. Pat. No. 3,287,324, U.S. Pat. No. 3,179,635, British Pat. No. 1,056,564 and U.S. Pat. No. 3,661,859.

Films of aromatic polyimides made heat-sealable with a surface layer of polytetrafluoroethylene (PTFE), polyhexafluoropropylene (PHFP), polyvinylidene fluoride (PVF$_2$) and copolymers of tetrafluoroethylene and hexafluoropropylene (FEP) are disclosed in U.S. Pat. No. 3,352,714. Other patents which disclose film of aromatic polyimide made heat-sealable with a surface layer of FEP include U.S. Pat. Nos. 3,168,417, 3,179,634, 3,361,586, 3,455,774, 3,592,714, 3,617,617, 3,627,624, 3,642,569, 3,684,646 and 3,770,566.

However, such heat-sealable films have not proved to be entirely satisfactory for all purposes. The temperature required for heat sealing polyimide films coated with PTFE or FEP is so high that, when used for insulation on tin-coated copper electrical conductors, the tin coating is damaged at the temperatures required for making the heat-seal, and the solderability of the wire is thereby impaired and the conductor is embrittled. Coatings which are more thermally stable then PVF$_2$ are desired, and coatings of PHFP are very tacky.

Additionally, in the case of polyimide film which is coated with a fluoropolymer on only one side thereof, the strength of the coated/uncoated heat-seal (i.e., a heat seal of the coated side of the film to the uncoated side of the film) is low, and not strong enough for some purposes, especially after heat aging or exposure to high humidity.

When the coating layer of a coated film does not adequately adhere to the base layer, it will appear that the heat-seal values are poor even when the coating material seals to itself with high strength. A continuing problem in the case of polyimide base layers is that of attaining an acceptable level of adhesion of a thermally stable, heat-sealable fluoropolymer coating to the polyimide layer.

It is therefore an object of this invention to provide film of aromatic polymer having a second order transition temperature of at least 200° C., which is coated with a thermally stable fluoropolymer which is capable of being heat-sealed at temperatures which do not impair the solderability of tin-coated copper conductors or cause embrittlement of the conductor.

It is another object to provide such film which is coated on only one side with the fluoropolymer, yet has strong and durable heat seals when coated/uncoated heat seals are made.

It is a further object to provide such film wherein the coating layer adheres well to the base layer.

SUMMARY OF THE INVENTION

Film of aromatic polymer having a second order transition temperature of at least 200° C., which carries a coating of thermally stable fluoropolymer, which is heat-sealable at temperatures sufficiently low that the solderability of tin-coated copper conductors is not impaired, and which has strong and durable coated/uncoated heat seals, has now been made.

More specifically, according to the invention there is now provided a film having a base layer of an aromatic polymer having a second order transition temperature of at least 200° C., and, on at least one side thereof, a coating comprising a terpolymer consisting of 7 to 32% by weight of hexafluoropropylene units, and 93 to 68% by weight of tetrafluoroethylene units and vinylidene fluoride units, there being at least 12% by weight of said tetrafluoroethylene units and the ratio of said tetrafluoroethylene units to said vinylidene fluoride units being no greater than 5:3, provided that when the content of tetrafluoroethylene units is less than 30% by weight, the content of hexafluoropropylene units is less than 25% by weight.

BRIEF DESCRIPTION OF THE DRAWING

The FIGURE is a ternary composition plot, shown in triangular coordinates, of the ranges of the amounts of polymerized units of the terpolymer which constitutes the principal component of the coating of the coated film of the invention.

DETAILED DESCRIPTION OF THE INVENTION

By aromatic polyimide, polyamide and polyamide-imide are meant those polymers derived from a diamine in which each amino group is directly attached to a carbon atom of an aromatic ring, and from a tetra-, di- or tricarboxylic compound in which each carboxyl group is directly attached to a carbon atom of an aromatic ring; in the case of polycyclic aromatic compounds wherein two aromatic moieties are joined by an aliphatic hydrocarbon moiety, both aromatic moieties should be attached to the same carbon atom of the aliphatic hydrocarbon moiety. Typical such diamines include meta-phenylenediamine, para-phenylenediamine, 4,4'-diaminodiphenyl ether, 4,4'-diaminodiphenylmethane, 4,4'-diaminodiphenyl sulfone and benzidine. Typical such carboxylic compounds are the anhydrides, acyl halides, esters, etc., of compounds such as pyromellitic acid, benzophenone-3,3',4,4'-tetracarboxylic acid, isphthalic acid, terephthalic acid, 4,4'-bibenzoic acid, 2,2-bis(4-carboxyphenyl)propane, benzophenone-4,4-dicarboxylic acid, trimellitic acid, etc. By aromatic polyparabanic acids are meant those polymers derived from a diisocyanate in which each isocyanate group is directly attached to a carbon atom of an aromatic ring; typical such diisocyanates include 4,4'-diphenyl ether diisocyanate and 4,4'-diphenylmethane diisocyanate.

As the terms are employed herein, isophthalic acid and isophthaloyl chloride refer to and include materials and compositions based not only on pure isophthalic acid or isophthaloyl chloride, but also on commercial grades of isophthalic acid or isophthaloyl chloride, which include variable amounts, e.g., often up to about 5% by weight, of other isomers. Also, meta-phenylenediamine refers not only to the pure diamine, but also to commercial grades which contain variable amounts, e.g. up to about 5% by weight, of other isomers. The same may be true of any of the carboxylic compounds, diamines and diisocyanates referred to herein.

The aromatic polyimides are well known in the art, such as U.S. Pat. Nos. 3,179,634 and 3,190,856. Preparation of films thereof is described in those patents and in U.S. Pat. No. 3,179,614. A preferred polyimide is poly-bis(4-aminophenyl) ether pyromellitimide.

The aromatic polyamides, films thereof, and their preparation, are known in the art, such as U.S. Pat. Nos. 4,070,433, 3,287,324, 3,063,966, 3,068,188, 4,112,187, and Japanese Published Application No. 51-122167, and as described by Garlington and Swerlick in U.S. Application Ser. No. 130,851, filed Mar. 17, 1980. A preferred polyamide contains at least 85% meta-phenylene isophthalamide repeating units, and is preferably at least 95% such repeating units.

The aromatic polyamide-imides, films thereof, and their preparation, are also known in the art, such as U.S. Pat. No. 3,179,635 and British Pat. No. 1,056,564.

The aromatic polyparabanic acids, also known as poly(1,3-imidazolidine-2,4,5-triones), films thereof, and their preparation, are known in the art, such as U.S. Pat. No. 3,661,859.

Most of the aromatic polymers of the types described above have a second order transition temperature (also known as a glass transition temperature) of at least 200° C. The base layer of the coated film of the invention can be not only of any such above polymer which has a second order transition temperature of at least 200° C., but also can be any aromatic polymer which has a second order transition temperature above 200° C. Preferably the base layer has a second order transition temperature of at least 250° C.

In general, the base layer of the coated film of the invention has a Class F temperature classification for insulation (as rated with the IEEE No. 57 Test Procedure), which indicates suitability for continuous use at temperatures up to 155° C., and many are rated as Class H, which indicates suitability for continuous use at temperatures up to 180° C. The present invention provides coated film which has the same temperature classification as that of the base layer.

In the discussion which follows, terpolymer compositions are uniformly specified in percentages by weight and in the order tetrafluoroethylene (TFE): hexafluoropropylene (HFP): vinylidene fluoride ($VF_2$), and letters designate points shown in the Figure.

The principal constituent of the heat-sealable coating of the film of the invention is a terpolymer consisting of 7 to 32% by weight of hexafluoropropylene units, and 93 to 68% by weight of tetrafluoroethylene units and vinylidene fluoride units, there being at least 12% by weight of said tetrafluoroethylene units and the ratio of said tetrafluoroethylene units to said vinylidene fluoride units being no greater than 5:3, provided that when the TFE units are less than 30% by weight, the HFP units are less than 25% by weight, which terpolymer is defined by points A, B, C, D, E, and F of the FIGURE. A preferred composition is that consisting of 12–48% by weight of TFE, 7–25% by weight HFP and 30–81% by weight $VF_2$ (defined by points C, D, G, H and J in the FIGURE) because these compositions provide better retention of heat-seal strength upon heat aging and upon boiling in water. A more preferred composition is that consisting of 12–48% by weight of TFE, 7–24% by weight of HFP and 30–81% by weight of $VF_2$, provided that when the content of TFE units is less than 42% by weight, the content of HFP units is less than 15% by weight (defined by points C, L, M, N, K, H and J in the FIGURE), because coatings of polymers in this range, with addition of a particulate material, can be made that are nonblocking coated-side-to-coated-side; within this range the very best nonblocking performance is with polymers consisting of 44–48% by weight of TFE, 20–24% by weight of HFP and 30–34% by weight $VF_2$ (area I in the FIGURE), or with polymers consisting of 12–48% by weight of TFE, 7–13% by weight of HFP and 39–81% by weight $VF_2$ (area II in the FIGURE).

The terpolymer should have a molecular weight high enough to be film forming. For this purpose, an inherent viscosity of at least 0.1 dl/g is adequate, and an inherent viscosity of 0.2 to 0.6 dl/g is preferred, as measured at 30° C. on a solution of 0.1 g of polymer in 100 ml of a mixture of 86 wt. % tetrahydrofuran and 14 wt. % dimethylformamide. Terpolymers having an inherent viscosity as high as about 1.5 dl/g have been used to make the heat-sealable coated film of the invention.

The terpolymers described above are prepared by the polymerization of the monomers in an aqueous emulsion system with the aid of a free-radical generating catalyst by well known methods. The procedure is described in some detail in U.S. Pat. Nos. 2,968,649 and 4,123,603 which deal with compositions having elastomeric properties. Since the polymers of this invention are somewhat more plastic with less tendency to mass, they can be isolated from the polymerization latex by simpler procedures, e.g., filtration, washing and drying, than those described for the elastomeric polymers. If it is desired to use an aqueous latex to apply the coating to the base film, a suitable material can be prepared by creaming and stabilizing the polymerization product latex by known methods, for example those described in U.S. Pat. No. 3,962,169.

The coated film of the invention has a base layer of an polymer having a second order transition temperature of at least 200° C., preferably at least 250° C. This base layer can vary in thickness from about 2.5 micrometers (0.1 mil) to about 250 micrometers (10 mils), preferably from about 13 micrometers (½ mil) to about 50 micrometers (2 mils).

The coated film of the invention carries a continuous adherent layer of coating on either one or two sides of the base layer.

In the case of one-side coated film, coating weights of about 5 to 60 g/m$^2$ are typical. Although coating weights of 80 g/m$^2$ and greater can be made and provide good heat seals, such coating weights are usually not required and are uneconomical. Below coating weights of about 3 g/m$^2$ the heat seal strengths are usually marginal. Typical coating thickness are in the range of about 2.5 to 25 micrometers (0.1–1 mil).

In the case of two-side coated film, coating weights of about 5 to L 20 g/m$^2$ are typical, but in this case, the coating is distributed on both major film surfaces, and the thickness of coating needed on each surface can generally be lower than that needed for one-side coated film.

The coating can be formulated to contain an effective amount of an antiblocking agent.

The antiblocking agent can be a finely divided inorganic or organic substance, sometimes referred to as a particulate material. Such a material is included to provide antiblocking properties to the coated film, probably as a result of producing some degree of roughness to the surface of the coating. There is greater need to use a particulate material in the case of two-side coated film, compared to one-side coated film, because winding of rolls of product during continuous production results in the coating on one side of the film contacting the coating on the reverse side, and so greater amounts of antiblocking agent may be used in such cases. Terpolymers having increasingly greater amounts of HEP units therein tend to have greater tackiness, and thus greater amounts of antiblocking agent may be used in these cases also.

The particulate material is generally used in amounts from about 0.25 to 15% by weight of the terpolymer, and most often about 0.5 to 5% by weight. The particle sizes found useful for this material are from 0.25 micrometer to about 20 micrometers, preferably 0.5 to 10 micrometers.

Typical inorganic particulate materials include silica, alumina, titania, mica, clays, talc, calcium silicate, etc. Particles of organic polymers, such as polyvinyl chloride and polyphenylene sulfide, can also be used when the coating is applied from an aqueous dispersion.

Another way to achieve nonblocking characteristics with the instant terpolymer coatings, when applied from aqueous dispersion, is to incorporate an FEP copolymer therein in an amount of about 10 to 25% by weight, preferably about 15 to 20% by weight, based on the total weight of terpolymer and FEP copolymer. The FEP copolymers are copolymers of between about 50% and about 95% tetrafluoroethylene and between about 5% and about 50% of hexafluoropropylene, especially wherein the amount of hexafluoropropylene is between about 7% and about 27%, and are extensively described in such patents as U.S. Pat. Nos. 2,833,686; 2,946,763 and 3,051,683. Such amounts of FEP copolymer blended into the terpolymer render the coating nonblocking, and while the heat-seal strengths may be lowered slightly they remain at entirely acceptable levels. Although it is believed that the FEP copolymer blends into the terpolymer rather than behaving as a particulate material, the FEP is an effective antiblocking agent, and we do not wish to be bound by any specific theory as to why it is effective.

Rolls of coated film can be wound with an interleaving of a pellicle such as paper or polyethylene film to prevent blocking, thereby precluding the necessity to incorporate an antiblocking agent in the coating.

The coated film of the invention can be produced by either solvent coating or dispersion coating.

For solvent coating, solutions in solvents such as tetrahydrofuran, methyl ethyl ketone, and acetone, and mixtures thereof, can be used. Coating solutions having concentrations of about 10 to 40% (wt./vol.) can be used. Following application of the coating solution to the base film the solvent is removed. Drying temperatures will vary with the solvent used, but final drying temperatures in the range of 140° to 200° C. are typical.

For dispersion coating, an aqueous polymer dispersion (also termed a latex) prepared during synthesis of the terpolymer can be modified for use by creaming and stabilizing, as noted above. Dispersions containing 50 to 80% by weight solids can be used. After application of the dispersion to the base film, the water is removed by evaporation, usually with final drying temperatures in the range of 200°–225° C. In dispersion coating, a viscosity control agent such as polyacrylic acid can be used to control the viscosity of the aqueous dispersion coating bath, which in turn aids in controlling the coating thickness applied, but in some cases may lower the heat seal strength somewhat. The amount of surfactant used to stabilize the dispersion should be an amount which is sufficient to permit the dispersion to spread on and wet the base layer, but not so great that it will have a deleterious effect on heat-seal strength; adjustment of the amount for this purpose is easily done by one of ordinary skill.

When it is desired to employ a coating containing a particulate material, the latter can be added to either a coating polymer solution or an aqueous coating polymer dispersion before it is applied to the base film.

Well-known coating methods such as dip coating or kiss coating can be used in the case of two-side coated film, and kiss coating in the case of one-side coated film.

The terpolymers employed in the film coatings herein are somewhat elastomeric, and can be cured. Polyfunctional amines can be used for this purpose, and can be used in either solvent or dispersion coating. Examples of suitable polyamines include triethylenetetraamine and tetraethylenepentaamine. Use of a curing agent improves the strength and durability of coated-side-to-uncoated-side heat-seals. The polyamine, when used, is generally used in an amount of about 0.5 to 10% by weight, based on the terpolymer. Use of higher amounts of curing agent may lead to a greater tendency of the coated film to block. By polyfunctional amine curing agent is meant not only the amines per se, but functional derivatives thereof which also are curing agents, such as polyisocyanates, ureas, urethanes, carbamoyl halides, salts and sulfenamides.

The coated film of the invention can be heat sealed at temperatures in the range of 200° to 350° C. The pressure and dwell time during sealing can vary from one case to another, but a pressure of 20 psi (138 kilopascals) and dwell time of 20 seconds are typical. Temperatures of 350° C. and lower for short dwell times do not unduly damage tin-coated copper conductors and thus do not impair the solderability thereof, while the higher temperatures of 400° C. and greater required to heat-seal PTFE and FEP polymers result in damage to tin-coated copper conductors.

Heat-seal strengths of 1000–3000 g/2.54 cm (400–1200 g/cm) for coated-side-to-coated side (C/C) seals, and of 500–2200 g/2.54 cm (200–880 g/cm) and generally in excess of 1500 g/2.54 cm (600 g/cm) for coated-side-to-uncoated-side (C/U) seals, are readily attained with the film of the invention. The fact that strong coated-to-uncoated-side heat seals are readily made further permits the use of uncoated film in combination with coated film in building thick layers of insulation when desired.

Heat seals of the film of the invention are thermally durable, i.e., they remain stong, and have often even improved in strength, after aging at a temperature of 180° C. for periods up to 1000 hours. The heat-seals remain strong, and sometimes have even improved when placed in boiling water for periods up to 6 hours. Further, in preferred coatings of the invention, the heat-seals remain strong even after immersion for 18 hours in Brulin 715N or Brulin 1-4-77N, high pH detergent solutions, or in Skydrol LD, a phosphate ester hydraulic fluid, all used extensively in the aerospace industry; in many nonaerospace uses, however, resistance to attack by such materials is not important.

It is desirable and preferred that C/C seals be at least 1600 g/2.54 cm and maintain at least that value in the several tests just described, and that C/U seals be at least 800 g/2.54 cm and maintain at least that value in the same tests.

The coated film of the invention when formulated to contain an effective amount of an antiblocking agent in the coating, as described hereinabove, has nonblocking characteristics when tested at 52° C., and good roll formation.

In the examples to follow, the following test methods are employed.

Heat-seal strengths are peel strengths measured on fin seals 2.54 cm (1 inch) wide with a Suter tester or 1.27 cm (0.5 inch) wide with an Instron machine.

In the wire bend test, a metal wire of diameter 1.024 mm (AWG wire gauge 18) is wound for 15–20 cm (6–8 inches) of its length with a strip of the film to be tested which is 9.5 mm (⅜ inch) wide, the film strip being tightly wound on the wire with an overlap of about 50% and a wrap angle of about 45°, the two ends of the film strip being secured with small pieces of a pressure sensitive tape (tape with a backing of cellulose acetate film or of cellulose, e.g., "masking tape", is suitable). A small lathe can be used in wrapping the strip of film to be tested on a wire. The portion of wire insulated with film is then immersed for 30 seconds in a bath of molten solder (50:50 tin:lead) maintained at 300° C., removed from the bath, and permitted to cool and cleaned of any adherent solder. The insulated portion of wire is then bent back on itself so as to form 4 to 6 tight spiral loops around its own circumference, and the film insulation on the loops is examined by any breaks. The presence of one or more breaks in the film is rated as a failure, and no breaks in the film is a pass.

In the blocking test, squares of coated film, 10 cm by 10 cm in size, are arranged in pairs in a single stack, some of said pairs (generally 2 to 5 such pairs) being oriented coated-side-to-coated-side, and some of said pairs (generally 2 to 5 such pairs), in the case of one-side-coated film, being oriented coated-side-to-uncoated-side, with all said pairs being separated from one another by slip sheets (glassine paper is suitable). The stack, with a weight on it to provide a pressure of 6.9 kilopascals (1 psi), is placed in an oven which has been heated to 52° C. (125° F.) for 16 hours, removed from the oven, and allowed to cool to room temperature undisturbed. The pairs of sheets are separated and examined for damage to the coating. Any damage is a failure (−), and no damage is a pass (+).

To further illustrate the innovative aspects of the present invention, the following examples are provided.

EXAMPLE 1

An 18.5% by wt. solution is tetrahydrofuran (THF) of a terpolymer having 46:32:22% by weight of TFE:HFP:VF$_2$ polymerized units containing 1% by weight (based on terpolymer) of finely divided silica dispersed therein was prepared from 10 g of terpolymer, 50 cc of THF and 0.1 g of silica.

A base layer of heat-set film of poly-meta-phenylene isophthalamide, 25 micrometers thick, having a Tg (glass transition temperature) of 272° C., was taped to a glass plate. The base layer was coated with the above terpolymer solution with the aid of a doctor knife having a 51 micrometer (2 mil) clearance. The coated film was allowed to stand in air at room temperature to permit THF to evaporate, and then drying was completed in an oven at 160° C. for 5 minutes. The coated film was heat-sealed at 300° C./20 psi/20 sec. Heat-seal values were measured immediately and after aging at 180° C. for various times, for both coated-side-to-coated-side (C/C) and coated-side-to-uncoated-side (C/U), as follows:

|  | Heat-seals | |
|---|---|---|
|  | C/C (g/2.54 cm) | C/U (g/2.54 cm) |
| Immediate | 883 | 400 |
| Aged at 180° C., 250 hrs | 2467 | 1133 |
| Aged at 180° C., 500 hrs | 2533 | 650 |
| Aged at 180° C., 1000 hrs | 3000+ | 1467 |

The wire bend test was carried out, with the coated side of the film wound toward the outside and heat sealed in the solder bath; the film sealed, and passed the test as there were no breaks or failures.

EXAMPLE 2

A series of coated films with increasingly greater coating weights was prepared using a base film and coating solution like those of Example 1, and using doctor knives with various clearances, as follows:

| Doctor knife clearance (micrometers) | Coating weight (g/m$^2$) | Heat-seals | |
|---|---|---|---|
|  |  | C/C (g/2.54 cm) | C/U (g/2.54 cm) |
| 51 | 6.37 | 1183 | 492 |
| 102 | 12.2 | 2125 | 950 |
| 152 | 13.5 | 2450 | 1342 |
| 203 | 14.0 | 2617 | 1525 |

The heat-seal strength is seen to increase as coating weight increases.

EXAMPLE 3

A coated film was prepared using a base film and coating solution like that of Example 1, and using a doctor knife with a 203 micrometer (8 mil) clearance. The film was first dried in air at room temperature, then in an oven at 200° C. Samples of the coated film were heat-sealed at 300° C./20 psi/20 sec., and heat-seal strengths were measured after boiling in water for various times, as follows:

| Time in boiling water (hours) | Heat-seals | |
|---|---|---|
|  | C/C (g/2.54 cm) | C/U (g/2.54 cm) |
| 0 (no water boil) | 2900 | 1933 |
| 2 | 2133 | 1550 |
| 4 | 1675 | 833 |
| 5 | 1700 | 967 |
| 6 | 1767 | 1300 |

Although heat-seal strength is seen to decrease upon boiling in water, it remains well above the level needed for functionality.

EXAMPLE 4

A coated film was prepared from a base film of poly-bis(4-aminophenyl) ether pyromellitimide (Tg above 380° C.), 25 micrometers thick, and a coating solution like that of Example 1, using a doctor knife with a 203 micrometer (8 mil) clearance. The film was first dried in air at room temperature, then in an oven at 140° C. for 5 minutes. Samples were heat sealed at 300° C./20 psi/20 sec. Some of the sealed samples were aged at 180° C. for various times, with results as follows:

| | Heat-seals | |
|---|---|---|
| | C/C (g/2.54 cm) | C/U (g/2.54 cm) |
| Immediate | 2050 | 2000 |
| Aged at 180° C., 250 hrs | 3000 | 3000 |
| Aged at 180° C., 500 hrs | 3000 | 2867 |
| Aged at 180° C., 1000 hrs | 3000 | 1650 |

Other samples were placed in boiling water for various times, with results as follows:

| | Heat-seals | |
|---|---|---|
| Time in boiling water (hours) | C/C (g/2.54 cm) | C/U (g/2.54 cm) |
| 2 | 667 | 1617 |
| 6 | 1133 | 1316 |

EXAMPLE 5

A coated film was prepared from a base film of the polyamide prepared from 2-chloro-1,4-phenylene diamine and bis(4-aminophenyl) ether (9:1 molar ratio) and terephthaloyl chloride (Tg above 270° C.), 25 micrometers thick, and a coating solution like that of Example 1, using a doctor knife with a 203 micrometer (8 mil) clearance. The film was dried in air at room temperature, then in an oven at 140° C. Samples were heat-sealed, with results as follows:

| Heat-seals | |
|---|---|
| C/C (g/2.54 cm) | C/U (g/2.54 cm) |
| 2667 | 2200 |

EXAMPLE 6

A coated film was prepared from a base film like that of Example 4, by applying to it an aqueous dispersion of the terpolymer of Example 1 having a solids content of about 70% by weight, using doctor knives with different clearances, and using various temperatures for coalescence, followed by drying at 225° C. Samples were heat-sealed at 300° C./20 psi/20 sec., with results as follows:

| Doctor knife clearance (micrometers) | Coalescence temperature (°C.) | Approx. coating weight (g/m²) | Heat-seals (g/2.54 cm) C/C | C/U |
|---|---|---|---|---|
| 51 | 22 | 60 | 2700 | 375 |
| 51 | 40 | 60 | 2250 | 425 |
| 51 | 50 | 60 | 2800 | 233 |
| 33 | 70 | 39 | 833 | 320 |
| 38 | 70 | 45 | 1700 | 320 |

The heat-seal strength is seen to correlate with the amount of coating.

EXAMPLE 7

To 100 g of an aqueous terpolymer dispersion like that described in Example 6 was added 1.5 g of Epon Curing Agent H-2 (a blocked diamine of unknown constitution supplied under that tradename by Shell Chemical Co.) and the mixture was thoroughly stirred. The resulting dispersion was coated onto a base film like that of Example 4, using a doctor knife with a 51 micrometer clearance. The coating was coalesced at 70° C., then dried in an oven at 200° C. for 45 minutes. Samples were heat-sealed at 300° C./20 psi/20 sec., with results as follows:

| Heat-seals | |
|---|---|
| C/C (g/2.54 cm) | C/U (g/2.54 cm) |
| 3000 | 1600 |

EXAMPLE 8

A coated film was prepared using a base layer like that of Example 1 and an aqueous terpolymer dispsersion containing Epon Curing Agent H-2 like that of Example 7, using a doctor knife with a 51 micrometer clearance and the conditions of Example 7. Samples were heat-sealed as in Example 7 with results as follows:

| Heat-seals | |
|---|---|
| C/C (g/2.54 cm) | C/U (g/2.54 cm) |
| 2767 | 1067 |

EXAMPLE 9

To 3000 g of a 22.1% solids latex of a 44.8:24.2:31% by weight TFE:HFP:VF$_2$ terpolymer was added 25 g of Acrysol A-5 (a 25% solids solution of a high molecular weight polyacrylic acid supplied by Rohm & Haas), and 10% aqueous LiOH solution was added to a pH of 7. The clear supernatant liquid was removed and the resulting terpolymer dispersion contained 67.2% by weight solids (9A). A 40 ml portion of Solution T (Solution T is 0.9 g of Carbopol 934, a medium molecular weight polyacrylic acid, dissolved in 600 ml of distilled water and adjusted to pH 7-8 by addition of concentrated ammonium hydroxide) and 18.80 g of dispersion 9A were mixed together (9B).

To another 3000 g of the same 22.1% solids latex was added 25 g of Acrysol A-5 and a solution of 3.3 g of Gafac RE-610 (a complex phosphate ester of a nonionic surfactant of the ethylene oxide adduct type supplied by GAF) in 6.6 ml water, and 10% aqueous LiOH solution was added to a pH of 7. The clear supernatant liquid was removed and the resulting terpolymer dispersion contained 66.9% by weight solids (9C). A 40 ml portion of Solution T and 18.91 g of dispersion 9C were mixed together (9D).

Coated films were prepared by applying the above four terpolymer dispersions to sheets of a base layer like that of Example 4 with the aid of a doctor knife having a 38 micrometer (1.5 ml) clearance. The coated films were first dried and coalesced in air at room temperature, and then, after clamping to frames, in an oven at 325° C. for 4 minutes. Samples of each film were heat-sealed at 200° C. and at 250° C., in each case at 20 psi/20 sec., with results as follows:

| Coating dispersion | C/C Heat-seals (g/2.54 cm) | |
|---|---|---|
| | 200° C. | 250°C. |
| 9A | 2250 | 2660 |
| 9B | 3240 | 2750 |

-continued

| Coating dispersion | C/C Heat-seals (g/2.54 cm) | |
|---|---|---|
| | 200° C. | 250°C. |
| 9C | 5290 | 5650 |
| 9D | 2480 | 3430 |

EXAMPLE 10

To 18.80 g of dispersion 9A was added 0.633 g of finely divided silica (5% by weight of the terpolymer, average particle size 0.5 micrometer), and the silica was dispersed first by use of a magnetically impelled stirring bar, and then for 15 minutes with an ultrasonic dispersing probe, to provide dispersion 10A. Another dispersion prepared from 18.80 g of 9A, 0.633 g of silica, and 40 ml of Solution T was similarly made (10B).

The same procedure was repeated with 18.80 g of dispersion 9A and 1.898 g of silica (15% by weight of the terpolymer), to provide dispersion 10C. Another dispersion prepared from 18.80 g of 9A, 1.898 g of silica, and 40 ml of Solution T was similarly made (10D).

Coated films were prepared by applying the above four terpolymer dispersions to sheets of a base layer like that of Example 4 with the aid of a doctor knife having a 38 micrometer clearance. The coated films were dried and coalesced as in Example 9. Samples were heat sealed as in Example 9, with results as follows:

| Coating dispersion | C/C Heat-seals (g/2.54 cm) | |
|---|---|---|
| | 200° C. | 250° C. |
| 10A | 680 | 635 |
| 10B | 1950 | 1950 |
| 10C | 1220 | 820 |
| 10D | 1220 | 680 |

In all four cases, the surface tackiness of the terpolymer coating layer, observed when no silica was used, was eliminated.

EXAMPLE 11

To 18.80 g of dispersion 9A was added 40 ml of Solution T, to provide dispersion 11A.

To 18.80 g of dispersion 9A was added 7.60 g of a 26% by weight solids aqueous dispersion of an FEP copolymer (which copolymer has a specific infrared ratio, which is the ratio of the net absorbance in the infrared at a wave length of 10.18 micrometers divided by the net absorbance at 4.25 micrometers, of about 3.5; see U.S. Pat. No. 2,946,763, column 2, lines 1–23) and 40 ml of Solution T, to provide dispersion 11B.

To 14.1 g of dispersion 9A was added 5.8 g of the same FEP copolymer dispersion and 40 ml of Solution T, to provide dispersion 11C.

Coated films, and heat-sealed samples thereof, were prepared as described in Example 10, with results as follows:

| Coating dispersion | C/C Heat-seals (g/2.54 cm) | |
|---|---|---|
| | 200° C. | 250° C. |
| 11A | 2860 | 2540 |
| 11B | 2130 | 2680 |
| 11C | 2040 | 2490 |

The coating derived from dispersions 11A was tacky, while for those derived from 11B and 11C, the tackiness was eliminated. The coatings derived from 11B and 11C each contained 15% by weight of FEP copolymer, based on the total of terpolymer and FEP copolymer.

EXAMPLE 12

To 1000 g of a 22.7% solids latex of a 43.7:25.8:30.5% by weight TFE:HFP:VF$_2$ terpolymer was added 4.0 g of Acrysol A-5, and 10% aqueous ammonium hydroxide was added to a pH of 7.5. The clear supernatant liquid was removed and the resulting terpolymer dispersion (dispersion 12-1) contained 68.7% by weight solids.

Into 100 g of dispersion 12-1 were mixed, with the aid of a magnetically impelled stirrer, in the following order: 54.61 g of a 22.2% by weight solids aqueous dispersion of an FEP copolymer like that of Example 11; 229.73 g of deionized water; 12.487 g of Solution R (Solution R is 16.2 g of Carbopol 934 dissolved in 534 g of water); and 0.27 g of concentrated ammonium hydroxide, to provide dispersion 12-2.

To half of dispersion 12-2 was added 3.76 g of Solution S (Solution S consists of 19.8 g of deionized water, 19.8 g of isopropyl alcohol, 2.0 g of p-chloromethylphenyltrimethoxysilane, and 0.0396 g of glacial acetic acid), to provide dispersion 12-3.

Coated film (12A) was prepared by applying dispersion 12-3 to sheets of a polyimide base layer like that of Example 4. Coated film (12B) was prepared by applying dispersion 12-3 to a sheet of a film of a polyparabanic acid in which parabanic acid moities alternate with 4,4'-diphenylmethane moieties (having a Tg of 290° C.), 25 micrometers (1 mil) thick. In both cases, the coating dispersion was applied with the aid of a doctor knife having a 38 micrometer (1.5 mil) clearance, and the coated films were dried and coalesced first in air at room temperature and then in an oven at 325° C. for 4 minutes. Samples were heat sealed at 200° C./20 psi/20 sec., with results as follows:

| Coated film | C/C Heat-seals (g/2.54 cm) |
|---|---|
| 12A | 2270 |
| 12B | 2500 |

The coatings of both films contained 15% by weight of FEP copolymer based on the total of terpolymer and FEP copolymer, and both were non-tacky.

EXAMPLE 13

To 1000 g of a 21.8% solids latex of a 44.2:24.2:31.6% by weight TFE:HFP:VF$_2$ terpolymer was added 4.0 g of Acrysol A-5, and 10% aqueous ammonium hydroxide was added to a pH of 7. The clear supernatant liquid was removed and the resulting terpolymer dispersion (dispersion 13-1) contained 66.3% by weight solids.

Into 50 g of dispersion 13-1 were mixed, with the aid of a magnetically impelled stirrer: 109.1 g of deionized water; 26.35 g of the 22.2% by weight FEP copolymer aqueous dispersion described in Example 12; 6.05 g of Solution R; 0.13 g of concentrated ammonium hydroxide; and 3.65 g of Solution S, to provide dispersion 13-2.

Coated films were prepared from dispersion 13-2 and a base film like that of Example 4, as described in Example 10, and samples were heat sealed at 200° C./20 psi/20 sec.; the C/C heat-seals were 2580 g/2.54 cm. The coating layer contained 15% by weight of FEP copolymer based on the total of terpolymer and FEP copolymer, and was non-tacky.

EXAMPLES 14-32

Examples 14-32 are additional examples of the invention. These examples were all coated from solution in THF (18.5 wt./vol. %). In each case the coating composition contained 1% by weight of silica particles and 5.6% by weight of Epon Curing Agent H-2, based on the weight of terpolymer, except for Examples 14, 15, 31 and 32, which did not contain either silica or a curing agent, Example 16 which contained 1% silica but no curing agent, and Example 17 which contained 5.6% by weight of Epon Curing Agent H-2 but no silica. The base layer was like that of Example 1. Heat-sealed samples for tests were uniformly prepared at 300° C./20 psi/20 sec. Examples 16-19, 20, 25 and 28 are representative of most preferred coated films of the invention. Data on these examples is given in Tables 1 and 2. (Where blank spaces occur in Tables 1 and 2, no measurement was made.)

EXAMPLES 33-34

Examples 33 and 34 are further examples of the invention, and were coated from aqueous dispersion.

To 52.5 g of an aqueous dispersion of a TFE:HFP:VF$_2$ terpolymer were added, in the following order with stirring, 25 g of Solution Q (Solution Q is 1.8 g of Carbopol 934 dissolved in 600 ml of distilled water and adjusted to pH 7-8 by addition of concentrated ammonium hydroxide), 0.75 g of Epon Curing Agent H-2, 0.5 g of Tamol 850 (a sodium salt of a polymeric carboxylic acid supplied by Rohm & Haas), and 1.0 g of fine particles of polyphenylene sulfide.

A base layer like that of Example 1 was coated with the above coating composition with the aid of a doctor knife having a 51-micrometer clearance. The coated film was allowed to dry in air at room temperature for 30 minutes, then dried in air circulating ovens, first at 90° C. for 10 minutes, then at 180° C. for 5 minutes. Samples of the film were heat-sealed at 300° C./20 psi/20 sec, with results given in Tables 1 and 2.

TABLE 1

| | Terpolymer composition TFE:HFP:VF$_2$ | Heat-seals (g/2.54 cm) | | | | | |
|---|---|---|---|---|---|---|---|
| | | Initial | | Aged at 180° C., 1000 hrs | | Boiling water, 6 hrs. | |
| Ex. | (% by wt.) | C/C | C/U | C/C | C/U | C/C | C/U |
| 14 | 52:9:39 | 2080 | 1450 | | 1050 | | 1150 |
| 15 | 46:22:32 | 500 | 500 | | | | |
| 16 | 46:22:32 | 880 | 425 | 3000 | 1460 | | >800 |
| 17 | 46:22:32 | 2850 | 1550 | | | | |
| 18 | 46:22:32 | 1767 | 1267 | | | | |
| 19 | 46:22:32 | 1550 | 1050 | 980 | 650 | 1050 | 720 |
| 20 | 43:10:47 | 2280 | 1850 | 1720 | 1880 | 1900 | 1670 |
| 21 | 42.6:24.6:32.9 | 2120 | 1430 | 1550 | 1000 | 2130 | 870 |
| 22 | 34.8:20.3:44.9 | 2200 | 1520 | 1450 | 1770 | 1750 | 1180 |
| 23 | 35.1:24.4:40.5 | 1780 | 1130 | 1480 | 1150 | 1330 | 900 |
| 24 | 34.6:30.2:35.2 | 1720 | 1300 | 1280 | 820 | 1630 | 1050 |
| 25 | 26:10:64 | 2820 | 1580 | 2780 | 1620 | 2180 | 950 |
| 26 | 19:22:59 | 1920 | 1000 | | 980 | | 1270 |
| 27 | 18:18:64 | 3000 | 1600 | | 1370 | | 950 |
| 28 | 15:9:76 | 2400 | 1420 | 3000 | 2870 | 2430 | 1430 |
| 29 | 38.4:28.4:33.2 | 2600 | 1400 | 1200 | 880 | 2100 | 720 |
| 30 | 44.6:15.3:40.1 | 2400 | 1770 | | | 2100 | 1550 |
| 31 | 38:30:32 | 1400 | 1100 | | | | |
| 32 | 42:26:32 | 2600 | 1200 | | | | |
| 33 | 44.6:20.1:35.3 | 1800 | 950 | 3000 | 1830 | 770 | 520 |
| 34 | 39.7:20.8:39.5 | 1320 | 1030 | 3000 | 2450 | 1130 | 730 |

TABLE 2

| | Blocking at 50° C. | | Solvent resistance, 22° C., 18 hrs. as assessed by heat-seals, g/2.54 cm | | | | | |
|---|---|---|---|---|---|---|---|---|
| | | | Brulin 715N | | Brulin 1-4-77N | | Skydrol LD | |
| Ex. | C/C | C/U | C/C | C/U | C/C | C/U | C/C | C/U |
| 14 | − | + | | 1280 | | 1200 | | 970 |
| 15 | | | | | | | | |
| 16 | + | + | | >800 | | >800 | | >800 |
| 17 | | | | | | | | |
| 18 | | | | | | | | |
| 19 | + | + | 1920 | 1070 | 1750 | 800 | 1680 | 950 |
| 20 | + | + | 2800 | 2030 | 2730 | 2100 | 2830 | 1920 |
| 21 | − | + | 2570 | 1320 | 2080 | 1250 | 1750 | 1020 |
| 22 | − | + | 2000 | 1630 | 3000 | 1550 | 2830 | 1630 |
| 23 | − | + | 1970 | 1330 | 2020 | 1180 | 2170 | 1180 |
| 24 | − | + | 2370 | 1180 | 1650 | 1100 | 2120 | 1270 |
| 25 | + | + | 2970 | 1620 | 2970 | 1570 | 2570 | 1380 |
| 26 | − | + | | 1780 | | 2020 | | 1430 |
| 27 | − | + | | 1650 | | 1880 | | 1220 |
| 28 | + | + | 2010 | 1180 | 1800 | 900 | 1750 | 1080 |
| 29 | − | + | 2250 | 1230 | 2180 | 830 | 1930 | 980 |
| 30 | + | + | 2250 | 1680 | 2030 | 1630 | 2170 | 1630 |
| 31 | − | − | | | | | | |
| 32 | − | − | | | | | | |
| 33 | + | + | 1300 | 750 | 1250 | 580 | 1380 | 850 |
| 34 | + | + | 870 | 1020 | 970 | 1030 | 1120 | 930 |

EXAMPLE 35

To 50 ml of THF was added 10 g of a terpolymer like that of Example 1, and the mixture was stirred until the polymer dissolved. To this solution was added 0.6 g of Epon Curing Agent H-2 and 0.1 g of silica having an average particle size of 9 microns, and the mixture was stirred.

A base layer like that of Example 1 was coated with the above coating composition with the aid of a doctor knife having a 203-micrometer (8 mil) clearance. The coated film was allowed to stand in air at room temperature for 30 minutes to permit THF to evaporate, then dried in air circulating ovens, first at 90° C. for 10 minutes and then at 180° C. for 5 minutes. This procedure was repeated for the second side of the film, so as to prepare a two-side-coated film. Samples of the coated film were heat-sealed side-1-to-side-2, at 300° C./20 psi/20 sec, and found to average 1930 g/2.54 cm.

INDUSTRIAL APPLICABILITY

The principal use for the coated film of the invention is as wire insulation. This technically advanced film provides strong and durable heat-seals, even for C/U heat seals in the case of one-side-coated film. The coatings can be formulated to be nonblocking in the case of one-side-coated film, and for the more preferred compositions even in the case of two-side-coated film. The temperature required for heat-sealing the film of the invention is substantially lower than that for known thermally stable fluoropolymer coatings, and thus the film can be used in conjunction with tin-coated copper conductors and sealed without impairing the solderability of such conductor.

What is claimed is:

1. A film having a base layer of an aromatic polymer having a second order transition temperature of at least 200° C. and selected from the group consisting of aromatic polyamide, aromatic polyimide, and aromatic polyparabanic acid, and, on at least one side thereof, a coating comprising a terpolymer consisting of 7 to 32% by weight of hexafluoropropylene units, and 93 to 68% by weight of tetrafluoroethylene units and vinylidene fluoride units, there being at least 12% by weight of said tetrafluoroethylene units and the ratio of said tetrafluoroethylene units to said vinylidene fluoride units being no greater than 5:3, provided that when the content of tetrafluoroethylene units is less than 30% by weight, the content of hexafluoropropylene units is less than 25% by weight.

2. The film of claim 1 wherein said terpolymer consists of 12 to 48% by weight tetrafluoroethylene units, 7 to 25% by weight hexafluoropropylene units and 30 to 81% by weight vinylidene fluoride units.

3. The film of claim 2 wherein said terpolymer consists of 12 to 48% by weight tetrafluoroethylene units, 7 to 24% by weight hexafluoropropylene units and 30 to 81% by weight vinylidene fluoride units, provided that when the content of tetrafluoroethylene units is less than 42% by weight, the content of hexafluoropropylene units is less than 15% by weight.

4. The film of claim 3 wherein said terpolymer consists of 44 to 48% by weight tetrafloroethylene units, 20 to 24% by weight hexafluoropropylene units and 30 to 34% by weight vinylidene fluoride units.

5. The film of claim 3 wherein said terpolymer consists of 12 to 48% by weight tetrafluoroethylene units, 7 to 13% by weight hexafluoropropylene units and 39 to 81% by weight vinylidene fluoride units.

6. The film of claim 1 wherein said aromatic polymer has a second order transition temperature of at least 250° C.

7. The film of claim 1 wherein said coating further comprises a copolymer of 50 to 95% by weight of tetrafluoroethylene units and 50 to 5% by weight of hexafluoropropylene units, said copolymer constituting 10 to 25% by weight of the total of said copolymer and said terpolymer.

8. The film of claim 1 wherein said coating further comprises a finely divided material in an amount of 0.25 to 15% by weight based on the weight of said terpolymer.

9. The film of claim 8 wherein said finely divided material is silica.

10. The film of claim 8 wherein said coating further comprises a polyamine curing agent.

11. The film of claim 1 wherein said base layer is a wholly aromatic polyamide, at least 85% of the repeating units of which are meta-phenylene isophthalamide units.

12. The film of claim 11 wherein said base layer is poly-meta-phenylene isophthalamide.

13. The film of claim 1 wherein said base layer is poly-bis(4-aminophenyl) ether pyromellitimide.

14. The film of claim 1 wherein in said aromatic polyparabanic acid, parabanic acid moieties alternate with 4,4'-diphenylmethane moieties or 4,4'-diphenyl ether moieties.

* * * * *